United States Patent
Mykkänen et al.

(10) Patent No.: US 11,965,725 B2
(45) Date of Patent: Apr. 23, 2024

(54) CHARGING SYSTEM FOR CHARGING AT LEAST ONE CHARGING HOLE

(71) Applicant: NORMET OY, Iisalmi (FI)

(72) Inventors: Anssi Mykkänen, Iisalmi (FI); Harri Puumalainen, Iisalmi (FI); Kalle Määttä, Iisalmi (FI); Samu Kukkonen, Iisalmi (FI)

(73) Assignee: Normet Oy, Iisalmi (FI)

( * ) Notice: Subject to any disclaimer, the term of this patent is extended or adjusted under 35 U.S.C. 154(b) by 113 days.

(21) Appl. No.: 17/753,888

(22) PCT Filed: Sep. 22, 2020

(86) PCT No.: PCT/FI2020/050608
§ 371 (c)(1),
(2) Date: Mar. 17, 2022

(87) PCT Pub. No.: WO2021/058861
PCT Pub. Date: Apr. 1, 2021

(65) Prior Publication Data
US 2022/0357142 A1 Nov. 10, 2022

(30) Foreign Application Priority Data
Sep. 24, 2019 (FI) .................................... 20195802

(51) Int. Cl.
*F42D 1/22* (2006.01)
*F42D 1/10* (2006.01)
*F42D 3/04* (2006.01)

(52) U.S. Cl.
CPC ................ *F42D 1/22* (2013.01); *F42D 1/10* (2013.01); *F42D 3/04* (2013.01)

(58) Field of Classification Search
CPC ................ F42D 1/22; F42D 1/10; F42D 3/04
(Continued)

(56) References Cited

U.S. PATENT DOCUMENTS 4,508,035 A * 4/1985 Mashimo ................ E21B 7/025
299/13
4,592,282 A * 6/1986 Niemi ....................... F42D 1/10
299/13
(Continued)

FOREIGN PATENT DOCUMENTS

EP 2725183 A1 4/2014
SE 1450818 A1 7/2014

OTHER PUBLICATIONS

International Search Report, PCT/FI2020/050608, dated Dec. 18, 2020 (5 pages).
(Continued)

*Primary Examiner* — Samir Abdosh
(74) *Attorney, Agent, or Firm* — Thomas | Horstemeyer, LLP

(57) ABSTRACT

The application relates to a charging system for charging at least one charging hole. The system comprises a charging boom, sensors of the boom, a movement mechanism of the boom, a charging head of the boom for charging the at least one hole, and a controller for controlling the boom. The sensors obtain location information relating to the boom. The controller defines locations of the charging head in a co-ordinate system of the boom on the grounds of at least the obtained location information. The controller also operates the movement mechanism to move the charging head between the defined locations in accordance with precalculated movements.

16 Claims, 2 Drawing Sheets

(58) Field of Classification Search
USPC .......................................................... 86/20.15
See application file for complete search history.

(56) References Cited

U.S. PATENT DOCUMENTS

| 10,378,353 | B2 * | 8/2019 | Wang | ...................... | E21C 37/00 |
| 2017/0356292 | A1 * | 12/2017 | Wang | ...................... | E21C 37/12 |
| 2017/0356730 | A1 * | 12/2017 | Wang | ...................... | E21C 37/12 |

OTHER PUBLICATIONS

Search Report, Finland App. 20195802, dated Apr. 8, 2020 (1 page).

* cited by examiner

CHARGING SYSTEM FOR CHARGING AT LEAST ONE CHARGING HOLE

CROSS-REFERENCE TO RELATED APPLICATIONS

This application is the 35 U.S.C. § 371 national stage application of PCT Application No. PCT/FI2020/050608, filed Sep. 22, 2020, where the PCT claims priority to, and the benefit of, FINNISH application no. 20195802, filed Sep. 24, 2019, both of which are herein incorporated by reference in their entireties.

TECHNICAL FIELD

The application relates generally to a charging system for charging at least one charging hole.

BACKGROUND

Blasting of rock structures in underground mines and tunnels requires drilling of blasting holes into the rock structures and charging of these drilled holes. The charging process is performed by means of mobile chargers in accordance with a predesigned charging map.

The chargers have a designed place for boosters and detonators, a tank for liquid explosive that is hosed through a charging hose into the holes, a hosing system for performing the hosing of explosive, a feeding system for feeding the hose, and a movable, telescopic basket boom that lifts, as well as supports, the hose and an operator, who is able to perform the charging in a vicinity of e.g. a tunnel face. A basket installed at the end of basket boom enables the operator to charge the holes by installing a booster with a detonator and hosing the explosive into each drilled hole even if the holes locate several meters from a floor level of tunnel, and a charger has been parked and supported by means of support legs far, e.g. 4-6 meters, from the tunnel face.

One solution to make the charging more safe to the operator is a movable safety roof on the basket of basket boom for preventing rocks to fall from the tunnel face and from the tunnel vault into the basket and causing injuries to the operators.

SUMMARY

One object of the invention is to withdraw drawbacks of known solutions and to provide at least a semi-automatic charging system, which enables an operator of a charging machine to be apart from a vicinity of a rock surface to be blasted and an operation area of a charging boom of the machine, which improve a safety of the operator.

One object of the invention is fulfilled by providing a charging system, controller, methods, computer program, and computer-readable storage medium according to the independent claims.

One embodiment of the invention is a a charging system for charging at least one charging hole. The system comprises a charging boom, sensors of the boom, a movement mechanism of the boom, a charging head of the boom for charging the at least one hole, and a controller for controlling the boom. The sensors obtain location information relating to the boom. The controller defines locations of the charging head in a co-ordinate system of the boom on the grounds of at least the obtained location information. The controller also operates the movement mechanism to move the charging head between the defined locations in accordance with precalculated movements.

One embodiment of the invention is a a charging method for charging at least one charging hole by means of the system, which is in accordance with the previous system embodiment. The method comprises a step of obtaining, by the the sensors of the charging boom, location information relating to the boom. The method also comprises a step of defining, by the controller of the boom, locations of the charging head of the boom in the co-ordinate system of the boom on the grounds of at least the obtained location information. The method also comprises a step of operating, by the controller, the movement mechanism of the boom to move the charging head between the defined locations in accordance with precalculated movements.

One embodiment of the invention is a a controller for charging at least one charging hole. The controller comprises a processor part and a data transfer part. The data transfer part receives location information relating to a charging boom from sensors of the boom. The processor part defines locations of a charging head of the boom in a co-ordinate system of the boom on the grounds of at least the obtained location information. The processor part also operates a movement mechanism of the boom to move the charging head between the defined locations in accordance with precalculated movements.

One embodiment of the invention is a a charging method for charging at least one charging hole by means of the controller, which is in accordance with the previous controller embodiment. The method comprises a step of receiving, by the data transfer part of the charging boom, location information relating to the boom from the sensors of the boom. The method also comprises a step of defining, by the controller of the boom, locations of the charging head of the boom in the co-ordinate system of the boom on the grounds of at least the obtained location information. The method also comprises a step of operating, by the controller, the movement mechanism of the boom to move the charging head between the defined locations in accordance with precalculated movements.

One embodiment of the invention is a computer program that comprises instructions which, when the program is executed by the controller, which is in accordance with the previous controller embodiment, cause the controller to carry out at least the steps of the previous method of the controller. The program comprises a reception code for receiving, by the data transfer part of the charging boom, location information relating to the boom from the sensors of the boom. The program also comprises a definition code for defining, by the controller of the boom, locations of the charging head of the boom in the co-ordinate system of the boom on the grounds of at least the obtained location information. The program also comprises a operation code for operating, by the controller, the movement mechanism of the boom to move the charging head between the defined locations in accordance with precalculated movements.

One embodiment of the invention is a tangible, non-volatile computer-readable storage medium that comprises the computer program, which is in accordance with the previous computer program embodiment.

Further embodiments of the invention are defined in the dependent claims.

BRIEF DESCRIPTION OF THE FIGURES

The exemplary embodiments are described with reference to the accompanying figures.

DETAILED DESCRIPTION OF THE FIGURES

Figure 1A:
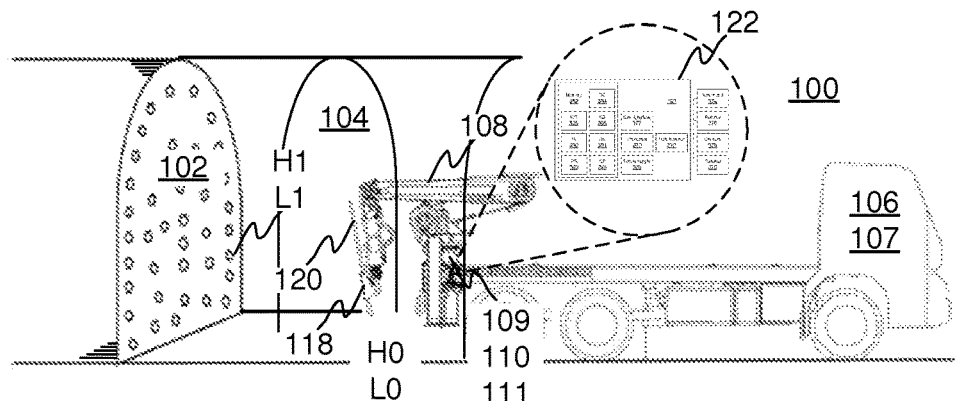
FIG. 1a presents a charging system when a charging boom is in a home location
Figure 1B:
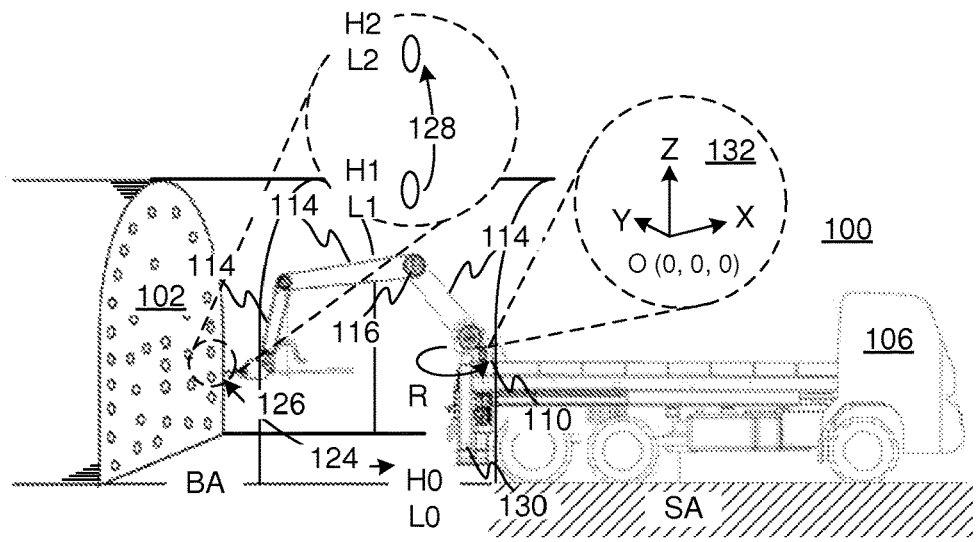
FIG. 1b presents the system when the boom is in a vicinity of a charging hole and movements of the boom between the home location and the hole, and between holes

FIGS. 1a and 1b presents an underground charging system 100 for charging at least one charging hole H1, H2, which locate on a surface structure 102, e.g. a rock surface structure in an underground tunnel 104, in a mine or in a quarry. The charging is performed by means of a charging machine (charger) 106 in order to prepare the structure 102 ready for its blasting later on.

The at least one hole H1, H2 comprises e.g. one, two, three, four, or more charging holes.

The machine 106 is e.g. a mobile charging machine that is suitable to be used in underground mining and tunnelling environment. The machine 106 is also capable of operating outside the mining and tunnel environment in other environments, e.g. in above ground environment, for same purposes.

The system 100 comprises a charging boom 108, e.g. a joints-connected boom in accordance with the figures, a telescopic charging boom, or a combination boom having joints-connected parts attached to a telescopic structure. The boom 108 is a part of the machine 106 and it is attached (installed) to the machine 106 by means of an attachment mechanism 110 so that it is possible to move the boom 108, e.g. to lift and to lower a charging head 118 at an end of boom 108, to move the charging head 118 linearly in a some direction, and to rotate (turn around) the charging head 118 and the whole boom 108 according to a movement R, by means of its movement mechanism 374 in relation to the attachment menchanism 110 (attachment point 111).

The structure of boom 108 in the examples of the figures comprises at least several boom parts 114, e.g. two, three, four, or more boom parts, that are connected to each other by means of joints 116 and the above-mentioned, joints-connected charging head 118 at the end of boom structure 108 in order to charge the hole(s) H1, H2. The joints 116 and attachment mechanism 110 allow to move the boom 108, i.e. the boom parts 114 and the charging head 118. The charging head 118 is used to attach a charging hose 120 to which is installed detonators and boosters and through which a bulk explosive, e.g. a liquid explosive (emulsion), is pumped into the hole(s) H1, H2.

The boom 108 also comprises several installed sensors 378 for obtaining its location information that is used for controlling the boom 108. The charging head 118 may comprise at least one installed sensor 378, e.g. one, two, three or more sensors. Each joint 116 in the boom 108 may comprise at least one installed sensor 378, e.g. one, two, three or more sensors. The sensors 378 make possible to determine a position and orientation of boom parts 114 and charging head 118, wherepon it is possible to determine a location and orientation of the charging head 118 when positions, orientation, and dimensions of each boom part 114 is known. An operator (not shown) of the boom 108 uses the sensors 378 to obtain at least location information of a home (home position, zero position, zero point) H0 of boom 108 and at least one hole (hole position, hole point) H1, H2 when the operator drives the boom 108 so that a tip of its charging head 118 "contacts" the desired home and holes H0, H1, H2.

The system 100 also comprises a controller (control part, control unit) 122 for controlling movements 124, 126, 128 and operations of the boom 108. The controller 122 is operated by the operator.

Figure 2:
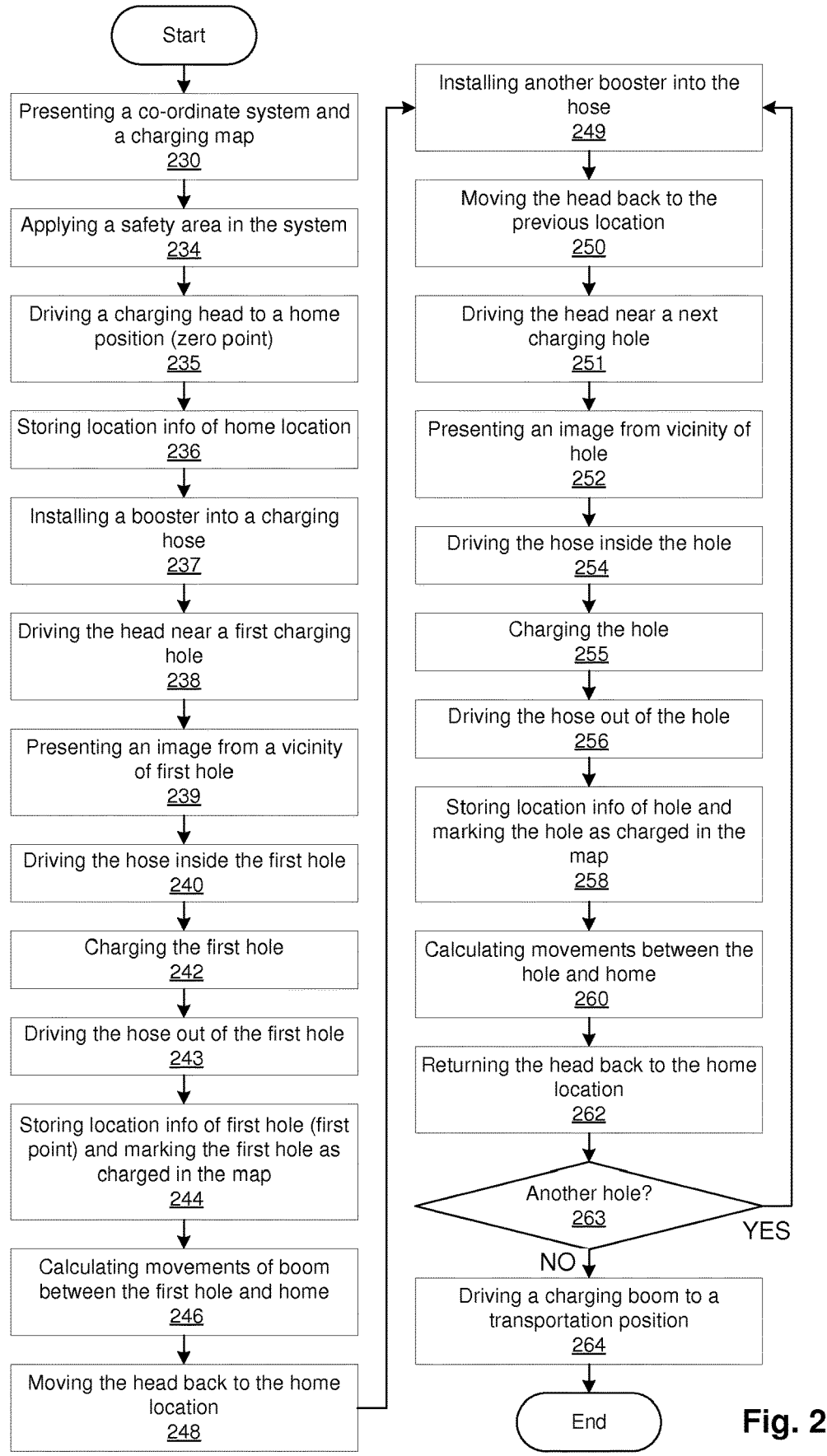
FIG. 2 presents a flowchart of charging method

FIG. 2 together with FIG. 1a-1b presents a charging process of the hole(s) H1, H2, and the movements of the boom 108 on the grounds of the defined home and hole(s) H0, H1, H2 during a blasting process.

Before the actual charging process, the hole(s) H1, H2 have been drilled into the surface (tunnel face) 102 according to a designed charging map (charging design, charging plan), which describes e.g. a pattern formed by the holes H1, H2 and distances between the holes H1, H2. The hole(s) H1, H2 may also locate in other parts of the tunnel 104, e.g. in its roof or floor. The charging map also describes e.g. a designed amount of explosive for each hole H1, H2 and a designed delay to be used for each hole H1, H2.

The controller 122 has received the information of the charging map through a data communication connection or from the operator, who inputs the information through a user interface (UI) of wireless remote controller 376 or a UI 377 of controller 122. The controller 122 maintains the charging map and updates it when necessary by means of information received through the data communication connection or from the operator.

The operator fills a tank of machine 106 with the explosive, if necessary, and equips the machine with required amount of detonators and boosters. Then, the operator drives the machine 106 near the surface (tunnel face) 102 to be blasted and positions the machine 106 so that its boom end 109 is e.g. about 4-5 meters from the surface 102 and the boom 108 points to the surface 102, and extends support legs 130 of machine 106.

The operator combines manually, the machine 106 combines automatically, or the operator and machine 106 in co-operation combine a required number of boosters with the detonators and the prepared combinations are put on the machine 106 or its vicinity so that it is possible to pick up a correct detonator according to the charging map during the charging process.

If a part of holes H1, H2 are blocked e.g. by rocks, the operator uses a basket boom (not shown) of machine 106 and opens manually the blocked holes H1, H2 by re-moving the rocks. Then, the operator folds the basket boom in its transport position so that the boom 108 has free space to operate and the charging of holes H1, H2 can be performed. Alternatively, the operator may use mechanical means, e.g. a steel-cable, pumped-water, pressured-air, or vacuum-suction means, which are designed to open the blocked holes H1, H2 before the basket boom. Alternatively, the opening of blocked holes H1, H2 is possible by means of the boom 108.

At step 230, the controller 122 presents and maintains a three-dimensional (3D) co-ordinate system 232, which has an origin 0 that locates in the attachment point 111, i.e. in the attachment mechanism 110, of the boom 108.

The co-ordinate system 132 together with the location information from the sensors 378 enables to locate the tip of charging head 118 in relation to the attachment mechanism 110, to define locations L0, L1, L2 of home and hole(s) H0, H1, H2, and to calculate the required movements 124, 126, 128 between the home and hole(s) H0, H1, H2 in order to perform the charging of hole(s) H1, H2 on the surface 102.

At step 230, the controller 122 may additionally present the charging map for the hole(s) H1, H2.

At step 234, the operator instructs by means of the remote controller 376 or the UI 377, the controller 122 to apply a safety area SA, which defines an area where the operator locates when the boom 108 is operated and to which the structures 114, 116, 118 of boom 108 are not allowed to enter because of a safety of the operator. The safety area SA is presented as diagonal lines in FIG. 1b. After applying the safety area SA, the controller 122 prevents the boom 108 to move to the safety area SA.

The safety area SA may be applied so that it starts from the support legs 130 in the boom end 109 and continues towards a cabin end 107 of the machine 106 in accordance with FIG. 1b. An area between the support legs 130 and tunnel face is defined as a boom area BA, where the boom 108 can move and the operator, for one, is not allowed to move.

The operator may also instruct by means of the remote controller 376 or UI 377, the controller 122 to store the definition of safety area SA into its memory part 382.

At step 235, the operator, who stands on the safety area SA, drives manually and remotely by means of the remote controller 376, the charging head 118 from its transportation position to its home position H0. The driving is performed so that the operator instructs the controller 122 to cause the movement mechanism 374 to move the charging head 118.

At step 236, when the charging head 118 (boom 108) is in the designed home position H0, the controller 122 defines a location L0 (x0, y0, z0) of home H0 for the co-ordinate system 132 on a grounds of the location information from the sensors 378 and the operator instructs by means of the remote controller 376, the controller 122 to store this defined location L0 into its memory part 382. Alternatively, the home position H0 may locate in a predefined location L0 in the co-ordinate system 132, whereupon the controller 122 cause automatically the movement mechanism 374 to move the charging head 118 from the transportation position to this predefined home position H0 at movement step 235.

At step 237, the operator stands on the safety area SA, near the machine 106, where it is possible to reach the charging head 118, i.e. the charging hose 122, safely without entering the boom area BA. The operator installs (mounts, inserts) a correct booster with its detonator to the charging hose 120. Alternatively, this installation step 238 may be performed before previous storing step 236.

At step 238, the operator drives manually by means of the remote controller 376, the boom 108 from its home H0 near a first charging hole H1 so that the charging head 118 is in a vicinity of hole H1. The driving is performed similarly as described at step 235, i.e. the operator instructs by means of the remote controller 376 the controller 122 to cause the movement mechanism 374 to move the charging head 118.

At step 239, the operator instructs by means of the remote controller 376, the controller 122 to control a camera part 379, which is mounted in the charging head 118, to present a visual image from the vicinity of hole H1 on a display (screen, not shown) for the operator. The display may be in the remote controller 376, in the UI 377, in a cabin of the machine 106, or in some other location.

The visual image presentation on the display helps the operator to locate the holes H1, H2 and to observe theirs surroundings more clearly than previously in a dark and dim tunnel environment, whereupon the operator can control the charging head 118 remotely from the safety area SA.

The camera part 379 may comprise at least one machine-vision sensor, whereupon the movement mechanism 374 moves the charging head 118 at least at below described steps 240, 251, 254 on the grounds of sensor information received from the at least one machine-vision sensor 379.

At step 240, the operator drives manually by means of the remote controller 376, the charging head 118 on an opening of hole H1, halts it, and feeds the charging hose 120 inside the hole H1 by a charging mechanism (not shown) of hose 120 until it reaches a bottom of hole H1. The charging mechanism may locate at least one of the charging head 118, the structure of boom 108 and the machine 106. The driving is performed similarly as described at step 235.

At step 242, when the charging hose 120 has reached the bottom of hole H1 and the mounted booster with its detonator are installed in the hole H1, the operator instructs by means of the remote controller 376, the machine 106 to charge the designed amount of explosive in the hole H1 in accordance with the charging map.

At step 243, after the charging of explosive has been completed, the operator ex-tracts (takes out, drives) manually by means of the remote controller 376, the charging hose 120 outside from the hole H1 and restrains the halted charging head 118 in the vicinity of hole H1. The extraction of charging hose 120 may halt automatically when its end reachs a predefined distance from the charging head 118 or it may halt manually in accordance with instructions from the operator. The extraction is performed similarly as the feeding described at step 240.

At step 244, when the halted charging head 118 is in a desired position near the hole H1, the controller 122 defines a location L1 (x1, y1, z1) of hole H1 for the co-ordinate system 132 on a grounds of the location information from the sensors 378 and the operator instructs by means of the remote controller 376, the controller 122 to store this defined location L1 into its memory part 382.

The controller 122 may also update the charging map in its memory part 382 by marking the hole H1 in the charging map as charged and possibly other additional information.

At step 246, after the storage operation of location L1, the operator instructs, by means of the remote controller 376, the controller 122 to precalculate or the controller 122 independently on a consequence of the storage operation precalculates a movement 124 of the boom 108 that move the charging head 118 from the location L1 of hole H1 to the location L0 of home H0 and a movement 126 of the boom 108 that move the charging head 118 from the home location L0 back to the hole location L1, i.e. the back and forth movements 124, 126 between the defined locations L0, L1.

The system 100 is kinematically redundant so that the precalculated movements 124, 126 between the defined locations L0, L1, L2 are optimized in accordance with at least one optimization criterion.

At step 248, the operator instructs, by means of the remote controller 376, the controller 122 to cause or the controller 122 independently on a consequence of the precalculation operation causes the movement mechanism 374 to operate the boom structure 108 in accordance with the precalculated movement 124 so that the charging head 118 moves from the hole H1, i.e. the hole location L1, to the home H0, i.e. the home location L0, in accordance with the precalculated movement 124.

At step 249, the operator installs another booster with its detonator to the charging hose 120 in the home H0 similarly as described at step 237.

At step 250, after the booster installation has been completed, the operator instructs, by means of the remote controller 376, the controller 122 to cause the movement mechanism 374 to operate the boom structure 108 in accordance with the precalculated movement 126 so that the charging head 118 moves from the home location L0 back to the previous hole location L1 in accordance with the precalculated movement 126.

At step 251, after the precalculated movement 126 has been completed and the charging head 118 has arrived at the hole location L1, the operator drives manually by means of the remote controller 376, the boom 108 in accordance with a movement 128 from the hole H1 near a second charging hole H2 so that the charging head 118 is in a vicinity of hole H2. The driving is performed similarly as described at step 235.

At step 252, the operator instructs by means of the remote controller 376, the controller 122 to control the camera part 379 to present a visual image from the vicinity of hole H2 on the display for the operator similarly as described at step 239.

At step 254, the operator drives manually by means of the remote controller 376, the charging head 118 on an opening of hole H2 and feeds the charging hose 120 inside the hole H2 until it reaches its bottom similarly as described at step 240.

At step 255, when the charging hose 120 has reached the bottom of hole H2 and the mounted booster with its detonator are installed in the hole H2, the operator instructs by means of the remote controller 376, the machine 106 to charge the designed amount of explosive in the hole H2 in accordance with the charging map similarly as described at step 242.

At step 256, after the charging of explosive, the operator drives manually by means of the remote controller 376, the charging hose 120 outside from the hole H2 and stops the charging head 118 in the vicinity of hole H2. The driving is performed similarly as described at step 243.

At step 258, when the charging head 118 is in a desired position near the hole H2, the controller 122 defines a location L2 (x2, y2, z2) of hole H2 for the co-ordinate system 132 on a grounds of the location information from the sensors 378. The operator instructs by means of the remote controller 376, the controller 122 to store this defined location L2 into its memory part 382 similarly as described at step 244.

The controller 122 may also update the charging map in its memory part 382 by marking the hole H2 in the charging map as charged and possibly other additional information.

At step 260, after the storage operation, the operator instructs, by means of the remote controller 376, the controller 122 to precalculate or the controller 122 independently on a consequence of the storage operation precalculates a return movement of the boom 108 that move the charging head 118 from the location L2 of hole H2 to the location L0 of home H0 and, if necessary, a back movement of the boom 108 that move the charging head 118 from the home location L0 back to the hole location L2, i.e. the back and forth movements between the defined locations L0, L2 similarly as described at step 246.

At step 262, the operator instructs, by means of the remote controller 376, the controller 122 to cause or the controller 122 independently on a consequence of the precalculation operation causes the movement mechanism 374 to operate the boom structure 108 in accordance with the precalculated return movement so that the charging head 118 moves from the hole location L2 to the home location L0 in accordance with the precalculated return movement similarly as described at step 246.

At step 263, if there still exists at least one hole on the surface 102 that should be charged according to the charging map, the charging process continues at step 249 so that the operator installs another booster with its detonator to the charging hose 120 similarly as described at steps 237, 249 and, then, instructs the controller 122 to cause the movement mechanism 374 to move the charging head 118 from the home location L0 back to the previous hole location L2 in accordance with the precalculated back movement similarly as described at step 250. The charging of this at least one hole, a definition of its location, a definition of necessary at least one movement, and a realization of this at least one movement are performed similarly as described at steps 252, 254, 255, 256, 258, 260, 262. Alternatively, when all necessary holes H1, H2 has been charged, the process continues at step 264.

At step 264, the operator drives manually by means of the remote controller 376 the boom 108 from its home position H0 back to its transportation position. Alternatively, the controller 122 may drive automatically the boom 108 back to the transportation position.

After the driving of boom 108 to its transportation position, the operator uses the basket boom and binds detonator cords of the installed detonators in the charged holes H1, H2 to bunches. After the binding operation has been completed, the operator drives the basket boom back to its transport position, whereupon the charging process is completed and the rest of operations belonging to the blasting process can be performed.

Figure 3:
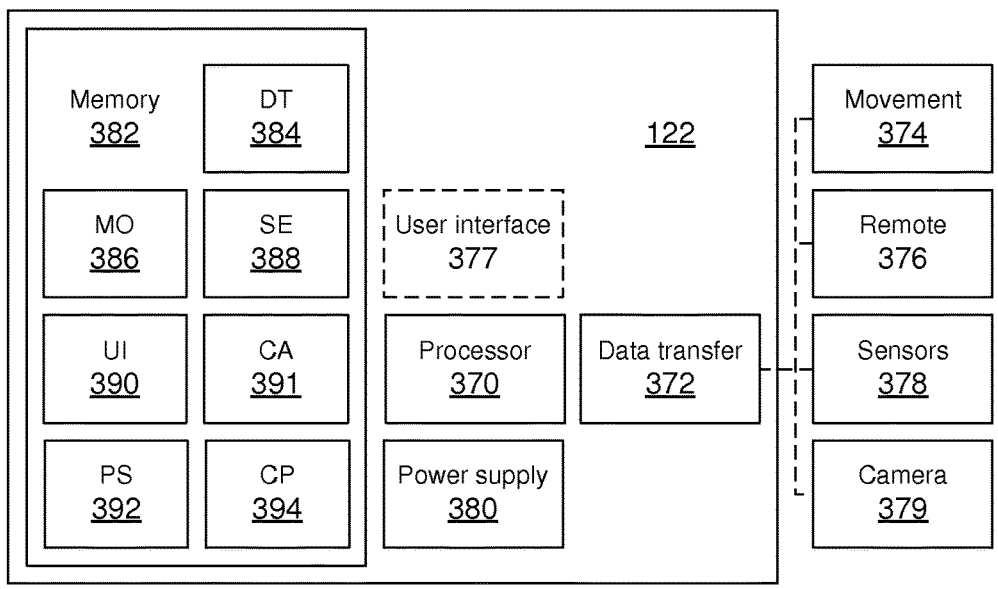
FIG. 3 presents parts of controller

FIG. 3 presents the controller 122 that is used to operate (control) the boom 108.

The controller 122 comprises a processor part 370 that performs operator-initiated and/or computer program-initiated instructions, and processes data in order to run applications. The processor part 370 may comprise at least one processor, e.g. one, two, three, or more processors.

The controller 122 also comprises a data transfer part 372 that the controller 122 uses in order to send commands, requests, and data to other components of the system 100, e.g. the movement mechanism 374, the remote controller 376, which provides a UI for the operator to use the controller 122 and to operate the boom 108, and the camera part 379. The data transfer part 372 also receives commands, requests, and data from the other components, e.g. the movement mechanism 374, remote controller 376, the sensors 378, and the camera part 379. The communication between the data transfer part 372, and the components 374, 378, 379 may be provided through a wired cable connections or wirelessly, and between the data transfer part 372 and the remote controller 376 wirelessly.

The controller 122 may comprise the UI 377 in order to use the controller 122, and to operate the boom 108, and the camera part 379.

The controller 122 also comprises a power supply part 380. The power supply part 380 comprises components for powering the controller 122, e.g. components to connect the controller 122 to a power supply system of machine 106 or its own battery.

The controller 122 also comprises a memory part 382 in order to store and to maintain data. The data may be instructions, computer programs, and data files. The memory part 382 comprises at least one memory, e.g. one, two, three, or more memories.

The memory part 382 stores at least a data transfer application 384 for operating (controlling) the data transfer part 372, a movement application 386 for operating the movement mechanism 374 of the boom 108, a sensor application 388 for operating the sensors 378, a user interface application 390 for operating the UI of remote controller 376 and the UI 377, if such exists, a camera application 391 for operating the camera part 379, and a power supply application 392 for operating the power supply part 380.

The memory part 382 also stores a computer program 394 (software, application), which uses at least one of parts 372, 374, 376, 378, 379, 380 in order to perform at least the operations of controller 122 described above in this description and figures, when it is run in a computer, e.g. in the controller 122, by means of the processor part 370.

The computer program 394 may be stored in a tangilble, non-volatile computer readable storage medium, e.g. a Compact Disc (CD) or Universal Serial Bus (USB)-type storage device.

The invention has been described above with reference to the above-mentioned exemplary embodiments and its several advantages have been demonstrated. It is clear that the invention is not only restricted to these embodiments, but it comprises all possible embodiments within the scope of following claims.

The invention claimed is:

1. A charging system for charging at least one charging hole, comprising
    a charging boom,
    sensors of the charging boom,
    a movement mechanism of the charging boom,
    a charging head of the charging boom for charging the at least one hole, and
    a controller for controlling the charging boom,
    wherein the sensors are configured to obtain location information relating to the charging boom and
    wherein the controller is configured to define locations of the charging head in a co-ordinate system of the charging boom on the grounds of at least the obtained location information and to operate the movement mechanism to move the charging head back and forth between the defined locations in accordance with precalculated movements.

2. The system according to claim 1, wherein the controller is configured to present the co-ordinate system, which is a three-dimensional co-ordinate system having an origin that locates at an attachment mechanism of the charging boom, whereupon each location in the co-ordinate system is located in relation to the attachment mechanism.

3. The system according to claim 1, wherein the controller is configured to receive instructions from an operator of the system to calculate the precalculated movements of the charging boom and the movement mechanism is configured to operate a structure of the charging boom to move the charging head in accordance with the precalculated movements.

4. The system according to claim 1, wherein the defined locations comprise at least a home location, where an operator of the system is able to insert a booster into a charging hose attached to the charging head, and a hole location at a vicinity of each charging hole.

5. The system according to claim 3, wherein the controller is configured to define the home and each hole locations in the co-ordinate system in relation to the attachment mechanism and to store these locations into a memory part of the controller in accordance with instructions from the operator.

6. The system according to claim 4, wherein the controller is configured to receive instructions from the operator to calculate the precalculated movements in order to move the charging head from each hole location to the home location and vice versa.

7. The system according to claim 4, wherein the controller is configured to receive instructions from the operator to move the charging head from the hole location of each charging hole to the home location and return back to the hole location of each charging hole after the insertion of the charging hose in accordance with the precalculated movements.

8. The system according to claim 1, wherein the system is kinematically redundant so that the precalculated movements between the defined locations are optimized in accordance with at least one optimization criterion.

9. The system according to claim 1, wherein the charging head is equipped with a camera part that is configured to present a visual image from a vicinity of each hole on a display for an operator of the system.

10. The system according to claim 9, wherein the camera part comprises at least one machine-vision sensor and the movement mechanism is configured to move the charging head on the grounds of sensor information received from the at least one machine-vision sensor.

11. The system according to claim 1, wherein the charging head in a vicinity of a hole is configured to receive instructions from an operator of the system to drive the charging hose attached to the charging head inside the hole, to charge the hole, and to drive the charging hose out of the hole.

12. The system according to claim 1, wherein the controller is configured to define a safety area for an operator of the system, where a presence of the structure of the charging boom is prevented, in the co-ordinate system.

13. A charging method for charging at least one charging hole, comprising at least steps of
    obtaining, by sensors of a charging boom, location information relating to the charging boom,
    defining, by a controller of the charging boom, locations of a charging head of the charging boom in a co-ordinate system of the charging boom on the grounds of at least the obtained location information, and
    operating, by the controller, a movement mechanism of the charging boom to move the charging head back and forth between the defined locations in accordance with precalculated movements.

14. A controller for charging at least one charging hole, comprising
    a processor part and
    a data transfer part,
    wherein the data transfer part is configured to receive location information relating to a charging boom from sensors of the charging boom and
    wherein the processor part is configured to define locations of a charging head of the charging boom in a co-ordinate system of the charging boom on the grounds of at least the obtained location information and to operate a movement mechanism of the charging boom to move the charging head back and forth between the defined locations in accordance with precalculated movements.

15. A charging method for charging at least one charging hole, comprising at least steps of
    receiving, by a data transfer part of a controller, location information relating to a charging boom from sensors of the charging boom,
    defining, by a processor part of the controller, locations of a charging head of the charging boom in a co-ordinate system of the charging boom on the grounds of at least the obtained location information, and
    operating, by the processor part, a movement mechanism of the charging boom to move the charging head back and forth between the defined locations in accordance with precalculated movements.

16. A tangible, non-transitory non-volatile computer-readable storage medium comprising a computer program that comprises instructions which, when the computer program is executed by a computer, cause the computer to carry out at least the steps of the charging method according to claim 15.

\* \* \* \* \*